United States Patent
Abotabl et al.

(10) Patent No.: US 12,021,799 B2
(45) Date of Patent: Jun. 25, 2024

(54) DUPLEX-MODE REMEDIATION FOR SELF INTERFERENCE

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Alexandros Manolakos, Escondido, CA (US); Hung Dinh Ly, San Diego, CA (US); Huilin Xu, Temecula, CA (US); Krishna Kiran Mukkavilli, San Diego, CA (US); Wanshi Chen, San Diego, CA (US); Tingfang Ji, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/758,417

(22) PCT Filed: Dec. 14, 2020

(86) PCT No.: PCT/US2020/064815
§ 371 (c)(1),
(2) Date: Jul. 6, 2022

(87) PCT Pub. No.: WO2021/145996
PCT Pub. Date: Jul. 22, 2021

(65) Prior Publication Data
US 2023/0044521 A1    Feb. 9, 2023

(30) Foreign Application Priority Data
Jan. 15, 2020 (GR) ............................. 20200100014

(51) Int. Cl.
*H04L 5/14* (2006.01)
*H04L 5/16* (2006.01)
(Continued)

(52) U.S. Cl.
CPC .............. *H04L 5/1461* (2013.01); *H04L 5/16* (2013.01); *H04W 74/0841* (2013.01)

(58) Field of Classification Search
None
See application file for complete search history.

(56) References Cited

U.S. PATENT DOCUMENTS 4,901,307 A * 2/1990 Gilhousen ............ H04B 7/2041
370/320
8,830,908 B2 9/2014 Duan et al.
(Continued)

FOREIGN PATENT DOCUMENTS

CN          109565434 A      4/2019
WO    WO-2012112950 A1      8/2012
(Continued)

OTHER PUBLICATIONS

International Search Report and Written Opinion—PCT/US2020/064815—ISA/EPO—dated Mar. 18, 2021.
(Continued)

*Primary Examiner* — Lonnie V Sweet
(74) *Attorney, Agent, or Firm* — Norton Rose Fulbright US LLP

(57) ABSTRACT

Systems and methods in which one or more wireless communication stations implement duplex-mode remediation to facilitate the signal communication when an issue with respect to self-interference is identified are described. Duplex-mode remediation may be implemented for various communication scenarios, such as for random access phase communications, for communications having different pri- (Continued)

orities, etc. A wireless communication station may implement one or more changes with respect to the full duplex operation of the wireless communication station based upon determining that an issue with respect to self-interference may be, or is being, experienced, such as to provide for a wireless communication station operating in an in-band full duplex mode to increase interference cancellation and/or to fall back to a sub-band full duplex mode or a half duplex mode, to provide for a wireless communication station operating in a sub-band full duplex mode to increase interference cancellation and/or to fall back to a half duplex mode.

24 Claims, 12 Drawing Sheets

(51) Int. Cl.
*H04W 74/08* (2009.01)
*H04W 74/0833* (2024.01)

(56) References Cited

U.S. PATENT DOCUMENTS

| | | |
|---|---|---|
| 9,131,524 B2 | 9/2015 | Gaal et al. |
| 2009/0213765 A1* | 8/2009 | Rinne .................. H04L 1/0026 370/278 |
| 2015/0382207 A1* | 12/2015 | Dimou .................. H04W 92/10 370/280 |
| 2016/0352386 A1* | 12/2016 | Mirzaei .................. H04B 1/525 |
| 2017/0026073 A1* | 1/2017 | Liu .......................... H04B 1/50 |
| 2017/0054544 A1 | 2/2017 | Kazmi et al. |
| 2018/0131502 A1* | 5/2018 | Askar .................... H04B 1/123 |
| 2018/0254927 A1* | 9/2018 | Yagil ........................ H04B 3/23 |
| 2019/0013923 A1 | 1/2019 | Liu et al. |
| 2019/0140811 A1 | 5/2019 | Abedini et al. |
| 2019/0305920 A1* | 10/2019 | Coomans .................. H04B 3/20 |
| 2020/0127699 A1* | 4/2020 | Wang ........................ H04B 1/44 |
| 2020/0305157 A1 | 9/2020 | Kim et al. |
| 2020/0359426 A1* | 11/2020 | Pan .................. H04W 74/0808 |
| 2021/0168678 A1* | 6/2021 | Deenoo .................. H04W 76/19 |

FOREIGN PATENT DOCUMENTS

| | | |
|---|---|---|
| WO | WO-2013052917 A2 | 4/2013 |
| WO | WO-2017111905 A1 | 6/2017 |
| WO | WO-2017159932 A1 | 9/2017 |

OTHER PUBLICATIONS

Yao Chao., et al., "X-Duplex: Adapting of Full-Duplex and Half-Duplex", 2015 IEEE Conference on Computer Communications Workshops (INFOCOM WKSHPS), IEEE, Apr. 26, 2015 (Apr. 26, 2015), pp. 55-56, XP033190108, DOI: 10.1109/INFCOMW.2015. 7179340 [retrieved on Aug. 4, 2015] the Whole Document.

* cited by examiner

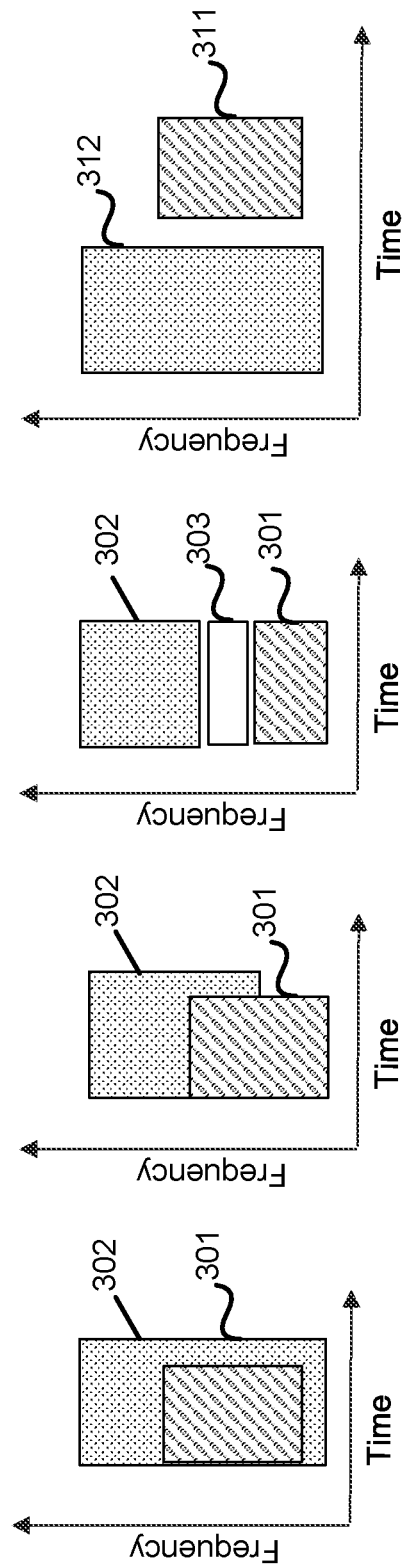

DUPLEX-MODE REMEDIATION FOR SELF INTERFERENCE

CROSS-REFERENCE TO RELATED APPLICATIONS

This application claims the benefit of priority to Greek Patent Application No. 20200100014, entitled, "DUPLEX-MODE REMEDIATION FOR SELF INTERFERENCE," filed on Jan. 15, 2020, the disclosure of which is expressly incorporated by reference herein in its entirety as if fully set forth below and for all applicable purposes.

BACKGROUND

Field

Aspects of the present disclosure relate generally to wireless communication systems, and more particularly, to duplex-mode remediation implemented with respect to self-interference.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the $3^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows. For example, as more and more wireless communication stations (base stations, UEs, etc.) are deployed and utilized for wireless communications, available wireless spectrum becomes more congested. Communication techniques, such as full duplex wireless communications, are often implemented to optimize use of the available wireless spectrum. Such communication techniques are not, however, without disadvantage. For example, self-interference may be experienced by a wireless communication station implementing full duplex communications. Such self-interference can result in transmission and/or reception failure during the wireless communications.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include analyzing, by a wireless communication station operating in a full duplex mode, one or more aspects of signal communication with regard to self-interference. The method may also include implementing, by the wireless communication station, duplex-mode remediation by falling back from the full duplex mode to facilitate the signal communication when the analyzing determines an aspect of the one or more aspects of the signal communication presents an issue with respect to self-interference.

In an additional aspect of the disclosure, an apparatus configured for wireless communication is provided. The apparatus may include means for analyzing, by a wireless communication station operating in a full duplex mode, one or more aspects of signal communication with regard to self-interference. The apparatus may also include means for implementing, by the wireless communication station, duplex-mode remediation by falling back from the full duplex mode to facilitate the signal communication when the analyzing determines an aspect of the one or more aspects of the signal communication presents an issue with respect to self-interference.

In an additional aspect of the disclosure, a non-transitory computer-readable medium having program code for wireless communication recorded thereon is provided. The program code may include code to analyze, by a wireless communication station operating in a full duplex mode, one or more aspects of signal communication with regard to self-interference. The program code may also include code to implement, by the wireless communication station, duplex-mode remediation by falling back from the full duplex mode to facilitate the signal communication when analyzing determines an aspect of the one or more aspects of the signal communication presents an issue with respect to self-interference.

In an additional aspect of the disclosure, an apparatus configured for wireless communication is provided. According to aspects of the disclosure, the apparatus includes at least one processor, and a memory coupled to the processor. The processor may be configured to analyze, by a wireless communication station operating in a full duplex mode, one or more aspects of signal communication with regard to self-interference. The processor may also be configured to implement, by the wireless communication station, duplex-mode remediation by falling back from the full duplex mode to facilitate the signal communication when the analyzing determines an aspect of the one or more aspects of the signal communication presents an issue with respect to self-interference.

In accordance with aspects of the disclosure, the foregoing systems, methods, and apparatuses may be implemented in combination with one or more additional features, such as the following features whether alone or in combination. For example, the above systems, methods, and apparatuses may include falling back from the full duplex mode including full duplex fall back selected from falling back to a sub-band full duplex mode from an in-band full duplex mode, falling back to a half duplex mode from the in-band full duplex mode, and falling back to the half duplex mode from the sub-band full duplex mode. The above systems, methods, and apparatuses may include transmitting a first message of a random access procedure, and monitoring for a second message of the random access procedure responsive to the first message, wherein the aspect of the signal communication determined to present an issue with respect to self-interference may include identifying a failure to receive the second message. The above systems, methods, and apparatuses may include transmitting a first message of a random access procedure, and monitoring for a second message of the random access procedure, wherein the implementing the duplex-mode remediation by falling back from the full duplex mode may alter the sub-band full duplex mode when the analyzing determines that the second message has not been received after transmission of the first message a threshold number of times. The above systems, methods, and apparatuses may include altering the sub-band full duplex mode by the implementing duplex-mode remediation including falling back to a half duplex mode from a sub-band full duplex mode. The above systems, methods, and apparatuses may include monitoring for a first message of a random access procedure, wherein the aspect of the signal communication determined to present an issue with respect to self-interference may include identifying a failure to receive the first message. The above systems, methods, and apparatuses may include the implementing duplex-mode remediation by falling back from the full duplex mode including falling back to a half duplex mode from the full duplex mode. The above systems, methods, and apparatuses may include the analyzing one or more aspects of signal communication determining that the signal communication comprises transmission or reception of a first communication and reception or transmission of a second communication, wherein the first communication may be determined to be of a higher priority than the second communication, and wherein the implementing the duplex-mode remediation by falling back from the full duplex mode may alter the full duplex mode to facilitate communication of the first communication when the analyzing determines that an issue with respect to self-interference is present. The above systems, methods, and apparatuses may include the full duplex mode including an in-band full duplex mode, and wherein altering the full duplex mode may include falling back to a sub-band full duplex mode from the in-band full duplex mode. The above systems, methods, and apparatuses may include the full duplex mode including an in-band full duplex mode, and wherein altering the full duplex mode may include falling back to a half duplex mode from the in-band full duplex mode. The above systems, methods, and apparatuses may include the full duplex mode including a sub-band full duplex mode, and wherein altering the full duplex mode may include falling back to a half duplex mode from the sub-band full duplex mode.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 3A-3D illustrate various configurations of full duplex modes as may be utilized by wireless communication stations according to aspects of the present disclosure.

DETAILED DESCRIPTION

Figure 1:
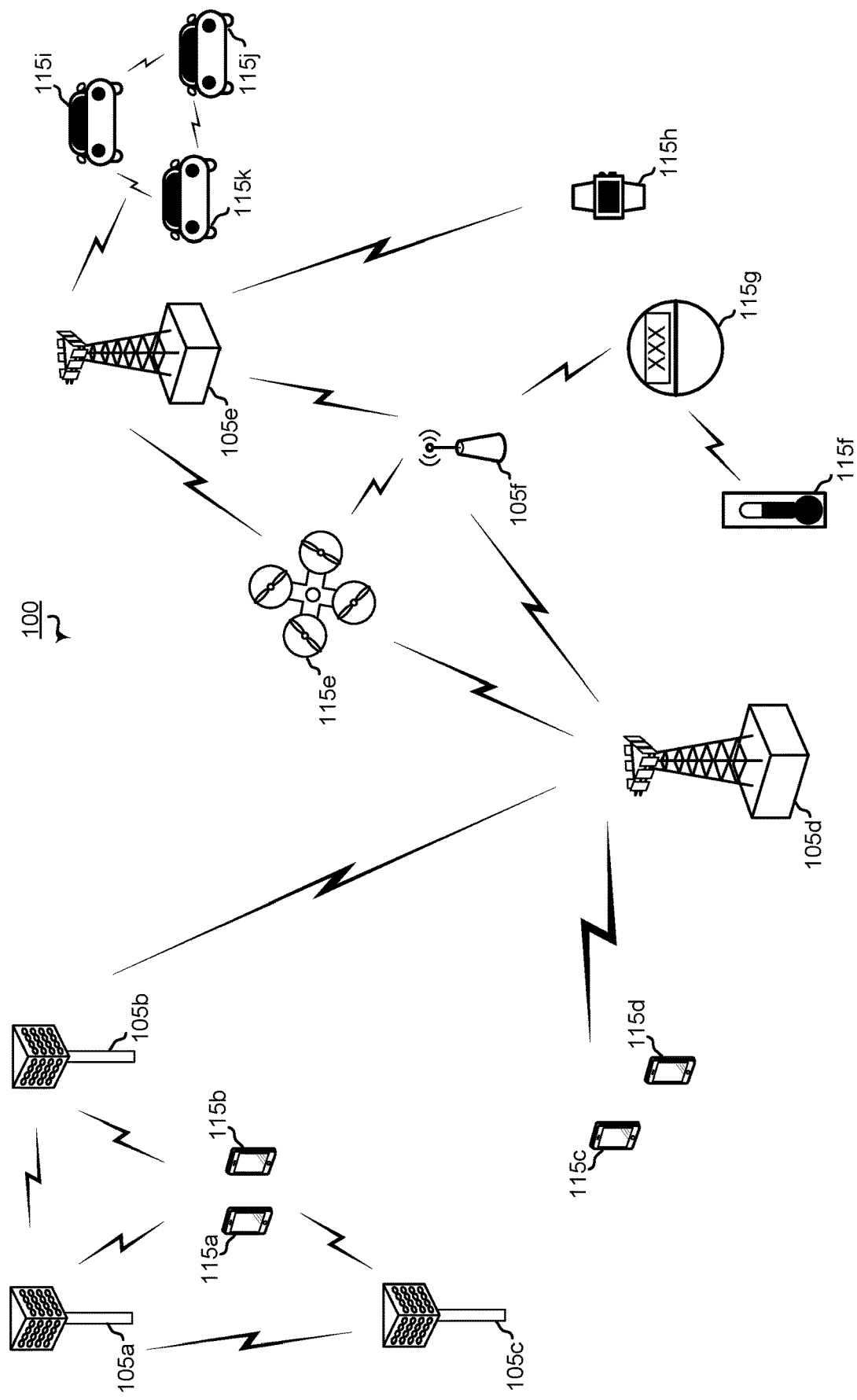
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. A wireless communication station implementing a full duplex mode with respect to wireless communications transmits and receives at the same time. Such full duplex wireless communications may result in instances of self-interference. Self-interference associated with the full duplex wireless communications can result in transmission and/or reception failure during the wireless communications.

To facilitate the signal communication a wireless communication station operating in a full duplex mode may implement duplex-mode remediation according to concepts of the present disclosure when an issue with respect to self-interference is identified. Duplex-mode remediation may, for example, be implemented for various communication scenarios, such as for random access phase communications, for communications having different priorities, etc. A wireless communication station may implement one or more changes with respect to the full duplex operation of the wireless communication station based upon determining that an issue with respect to self-interference may be, or is being, experienced. For example, a wireless communication may initiate changes to provide for a wireless communication station operating in an in-band full duplex mode to increase interference cancellation and/or to fall back to a sub-band full duplex mode or a half duplex mode, to provide for a wireless communication station operating in a sub-band full duplex mode to increase interference cancellation and/or to fall back to a half duplex mode.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of Things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as Internet of Everything (IoE) or Internet of Things (IoT) devices. UEs 115*a*-115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

Base stations 105 and/or UEs 115 may operate in a full duplex mode in operation of FIG. 1. Accordingly, in addition to external interference, one or more of base stations 105 and/or UEs 115 may experience self-interference associated with their full duplex mode transmissions. Accordingly, some or all of base stations 105 and/or UEs 115 may be configured for duplex-mode remediation according to concepts of the present disclosure. For example, a wireless station (e.g., base station 105, UE 115, etc.) configured according to some aspects, may implement duplex-mode remediation when an issue with respect to self-interference is identified.

In operation at 5G network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through 5G network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
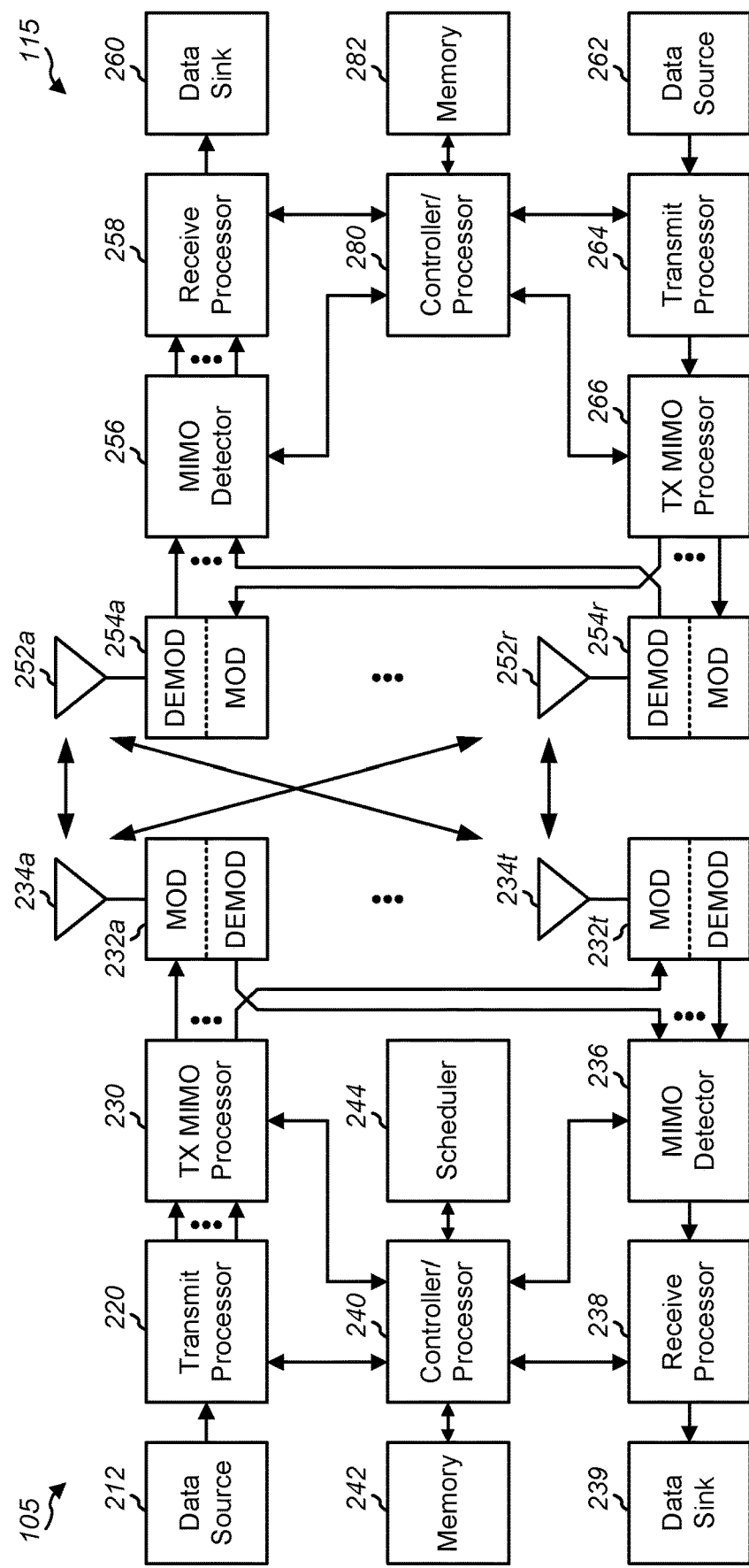
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of various processes for the techniques described herein. For example, controller/processor 240 and/or controller/processor 280 may perform or direct the execution of the functional blocks illustrated in FIGS. 5-8, and/or other processes for the techniques described herein. The memories 242 and 282 may store data and program codes for the base station 105 and the UE 115, respectively. A scheduler 244 may schedule UEs for data transmission on the downlink and/or uplink.

Various communication techniques may be utilized by the wireless communication stations (e.g., base stations 105, UEs 115, etc.) operating within 5G network 100. For example, any or all of base stations 105 and UEs 115 shown in FIG. 1 may implement a full duplex mode with respect to their wireless communications, such as to optimize use of the available spectrum. As discussed in detail below, one or more wireless communication stations implement duplex-mode remediation to facilitate the signal communication when an issue with respect to self-interference is identified according to concepts of the disclosure.

FIGS. 3A-3C illustrate various configurations of full duplex modes as may be utilized by wireless communication stations of 5G network 100. Correspondingly, FIG. 3D illustrates a configuration of a half duplex mode as may be utilized by wireless communication stations of 5G network 100. It should be appreciated that FIGS. 3A-3D present examples with respect to duplex mode configurations that may be utilized and are not intended to be limiting with respect to the particular duplex mode configurations that may be utilized by wireless communication stations that may implement duplex-mode remediation according to concepts of the disclosure.

As can be seen in FIGS. 3A-3C, uplink signals 301 of the full duplex modes overlap downlink signals 302 in time. That is, a wireless communication station implementing a full duplex mode with respect to wireless communications transmits and receives at the same time. In contrast, a wireless communication station implementing a half duplex mode with respect to wireless communications transmits and receives at different times. Accordingly, uplink signal 311 of the example half duplex mode shown in FIG. 3D does not overlap downlink single 312 in time.

Various configurations may be utilized with respect to a full duplex mode, as represented by the examples of FIGS. 3A-3C. For example, FIGS. 3A and 3B show examples of in-band full duplex, wherein uplink signals 301 of the full duplex modes overlap downlink signals 302 in time and frequency. That is, the uplink signals and downlink signals at least partially share the same time and frequency resource (e.g., full or partial overlap of the uplink and downlink signals in the time and frequency domains). In another configuration of a full duplex mode, FIG. 3C shows an example of sub-band full duplex, wherein uplink signal 301 of the full duplex mode overlaps downlink signal 302 in time, but not in frequency. That is, the uplink signals and downlink signals at least partially share the same time resource (e.g., full or partial overlap of the uplink and downlink signals in the time domain), but do not share the same frequency resource. In the example illustrated in FIG. 3C, uplink signal 301 and downlink signal 302 are separated in the frequency domain by guard band 303 (e.g., a relatively narrow amount of frequency spectrum separating the frequency band occupied by the uplink and downlink signals).

Although use of full duplex modes, such as those of FIGS. 3A-3C, with respect to wireless communications facilitates efficient use/reuse of wireless spectrum, these communication techniques may introduce issues with respect to self-interference experienced by the wireless communication stations implementing the full duplex communication techniques. For example, the use of shared frequency and time resources according to an in-band full duplex configuration is prone to self-interference due to co-located transmission and reception of signals with carrier frequency overlap at the same time. Even where carrier frequencies are separated by a guard band according to a sub-band full duplex configuration, co-located transmission and reception of signals at the same time is prone to self-interference due to relatively small separation of the carrier frequencies and the higher signals strength of the transmitted signal relative to the received signal at the wireless communication station. Such self-interference introduced by full duplex wireless communications can result in transmission and/or reception failure during the wireless communications. As an example, a base station utilizing a full duplex mode with respect to a random access phase of wireless communications may fail to receive a random access request message transmitted by a UE on an uplink due to interference from downlink transmission by the base station. Similarly, a UE utilizing a full duplex mode with respect to a random access phase of wireless communications may not receive a random access response message transmitted by a base station on a downlink due to interference from uplink transmission by the UE. As another example, when a higher priority communication is to be received by a wireless communication station while the wireless communication station is transmitting a lower priority communication using a full duplex mode, the higher priority communication may be compromised because of the transmission self-interference (e.g., a full duplex UE has a higher priority downlink communication and a lower priority uplink communication).

Figure 4A:
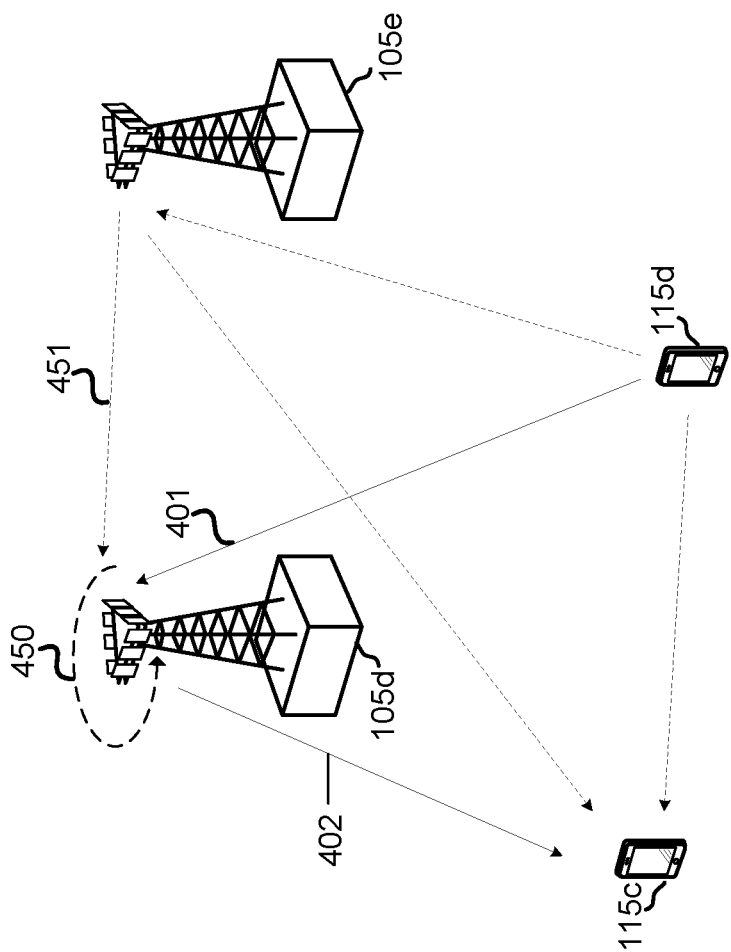
FIGS. 4A-4C illustrate instances of self-interference introduced by full duplex wireless communications according to aspects of the present disclosure.
Figure 4B:
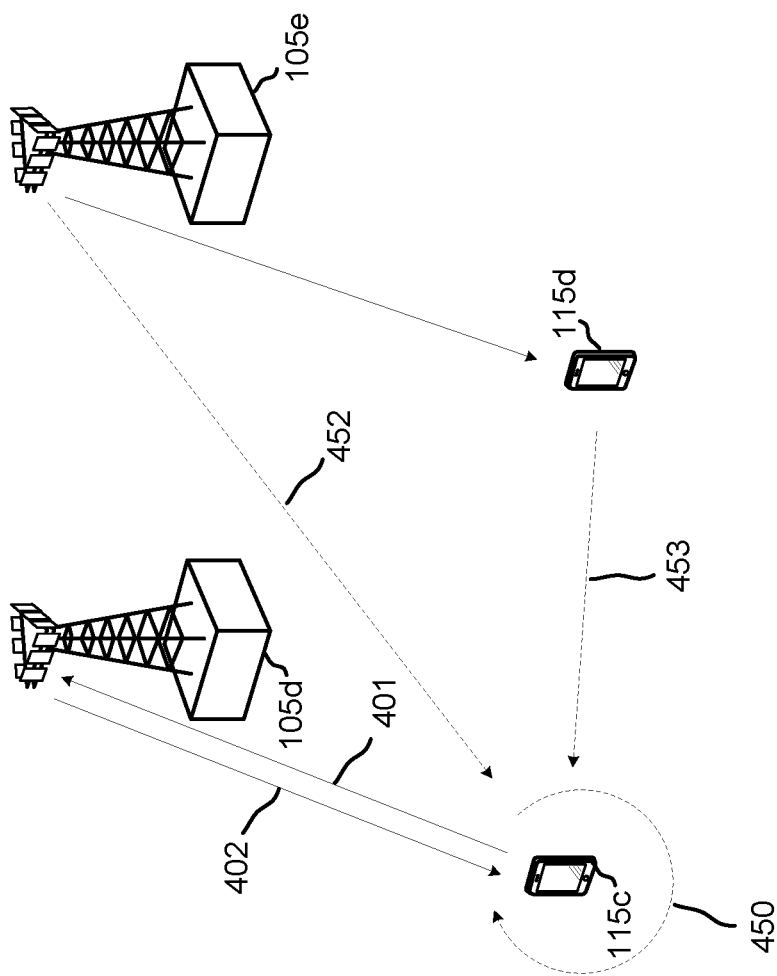
Figure 4C:
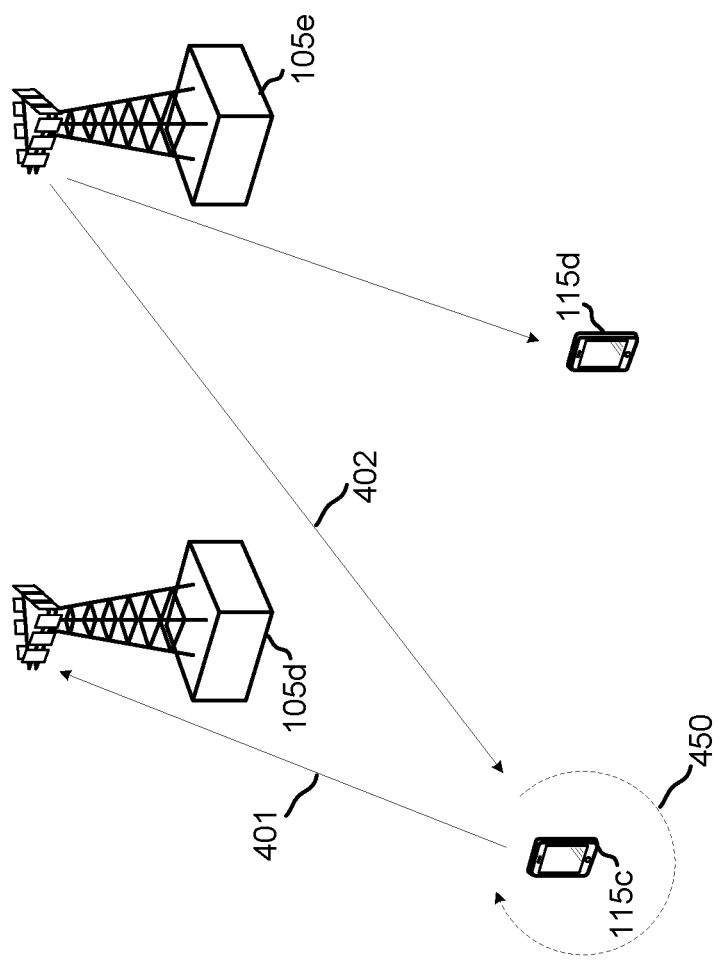

FIGS. 4A-4C illustrate example instances of self-interference introduced by full duplex wireless communications. It should be appreciated that FIGS. 4A-4C represent a portion of 5G network 100 selected for illustrating self-interference and that the particular base stations and UEs depicted are not intended to be limiting with respect to the various wireless communication stations that may be subject to self-interference or that may implement duplex-mode remediation according to concepts of the disclosure.

In the example of FIG. 4A, base stations 105d and 105e are each operating in a full duplex mode while UEs 115c and 115d are each operating in a half duplex mode. In this example, base station 105d receives uplink signal 401 and transmits downlink signal 402 using a shared time resource, and possibly a shared frequency resource. Accordingly, in addition to external interference (e.g., interference 451 from base station 105e), base station 105d experiences self-interference 450 associated with transmission of downlink signal 402 when attempting to receive uplink signal 401.

In the example of FIG. 4B, base station 105d and UE 115c are each operating in a full duplex mode. In this example, UE 115c transmits uplink signal 401 and receives downlink signal 402 using a shared time resource, and possibly a shared frequency resource. Accordingly, in addition to external interference (e.g., interference 452 from base station 105e and interference 453 from UE 115d), UE 115c experiences self-interference 450 associated with transmission of uplink signal 401 when attempting to receive downlink signal 402.

In the example of FIG. 4C, UE 115c is operating in a full duplex mode (e.g., implementing a multiple transmission and reception (multi-TRP) architecture). As with the example of FIG. 4B, UE 115c transmits uplink signal 401 and receives downlink signal 402 using a shared time resource, and possibly a shared frequency resource. Accordingly, UE 115c experiences self-interference 450 associated with transmission of uplink signal 401 when attempting to receive downlink signal 402.

Figure 5:
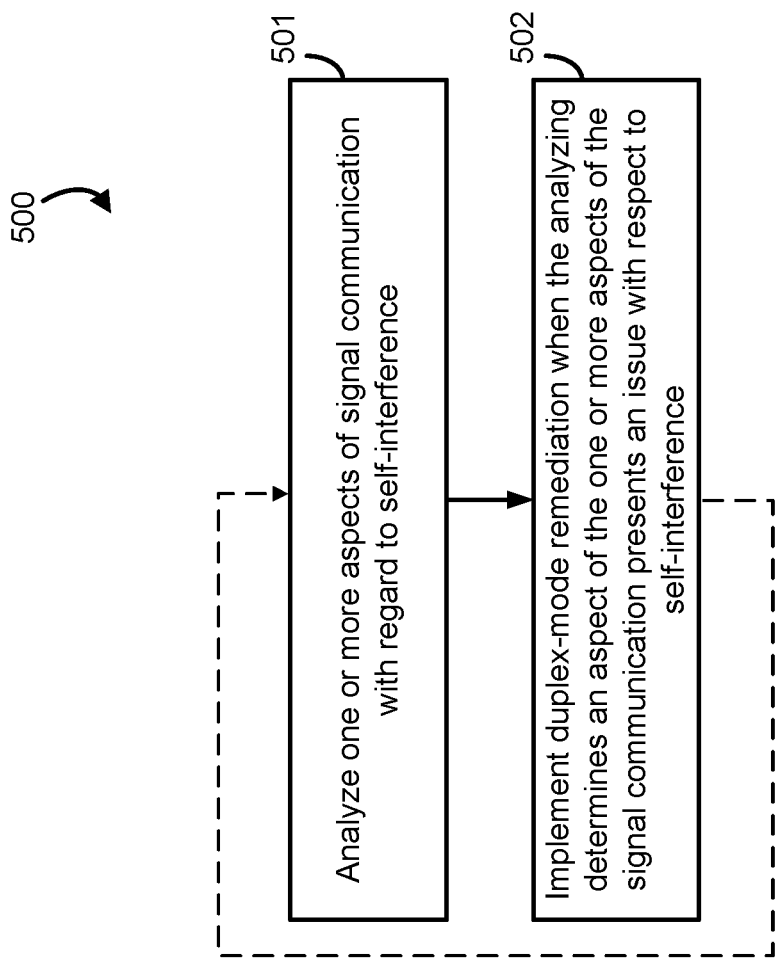
FIG. 5 is a flow diagram showing an example of operation by a wireless communication station to implement duplex-mode remediation according to aspects of the present disclosure.
Figure 6:
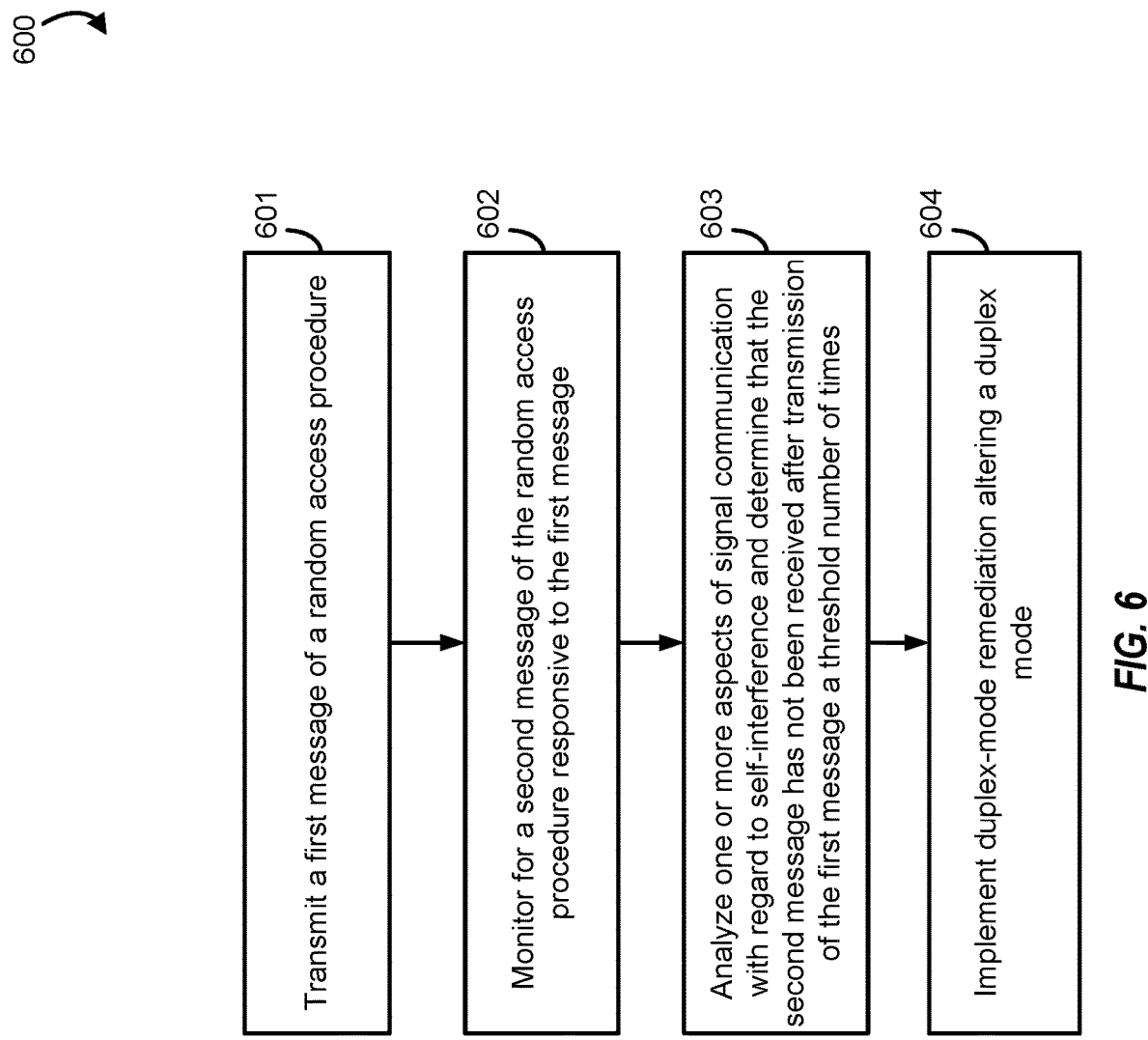
FIGS. 6-8 are flow diagrams showing examples of operation by wireless communication stations to implement duplex-mode remediation for various communication scenarios according to aspects of the present disclosure.
Figure 7:
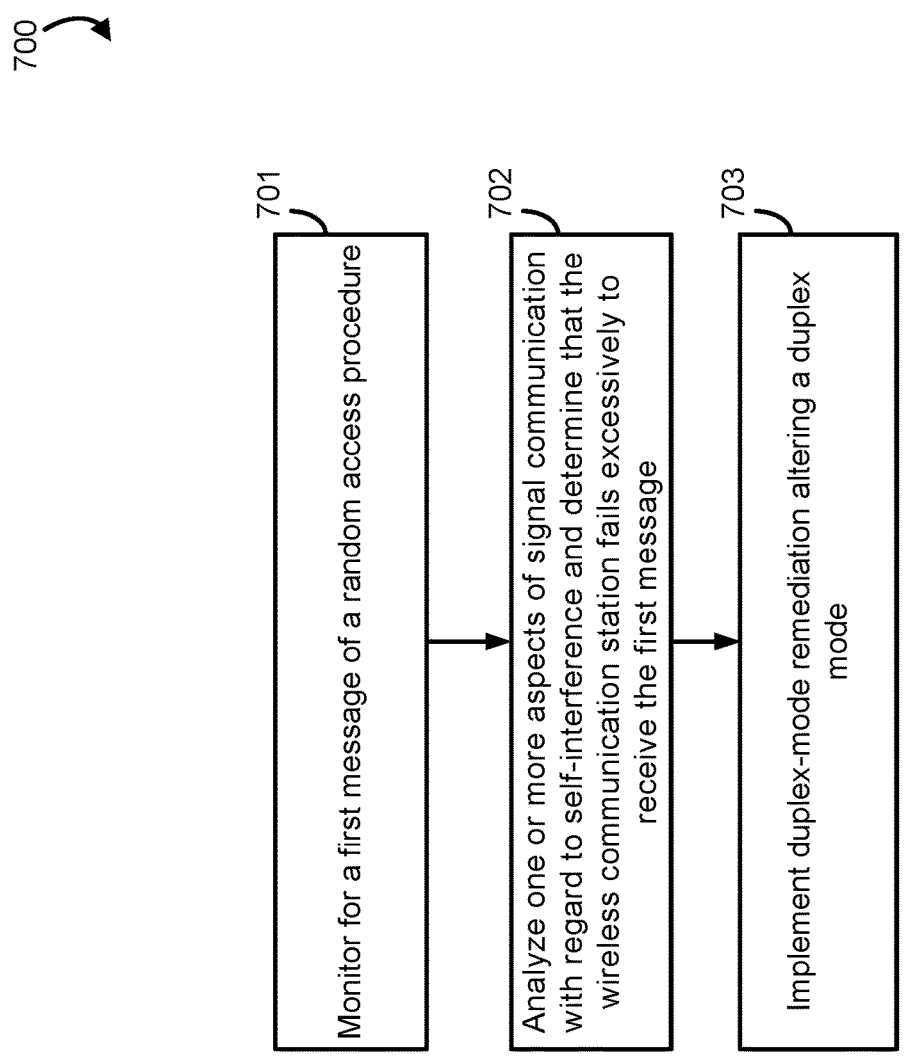
Figure 8:
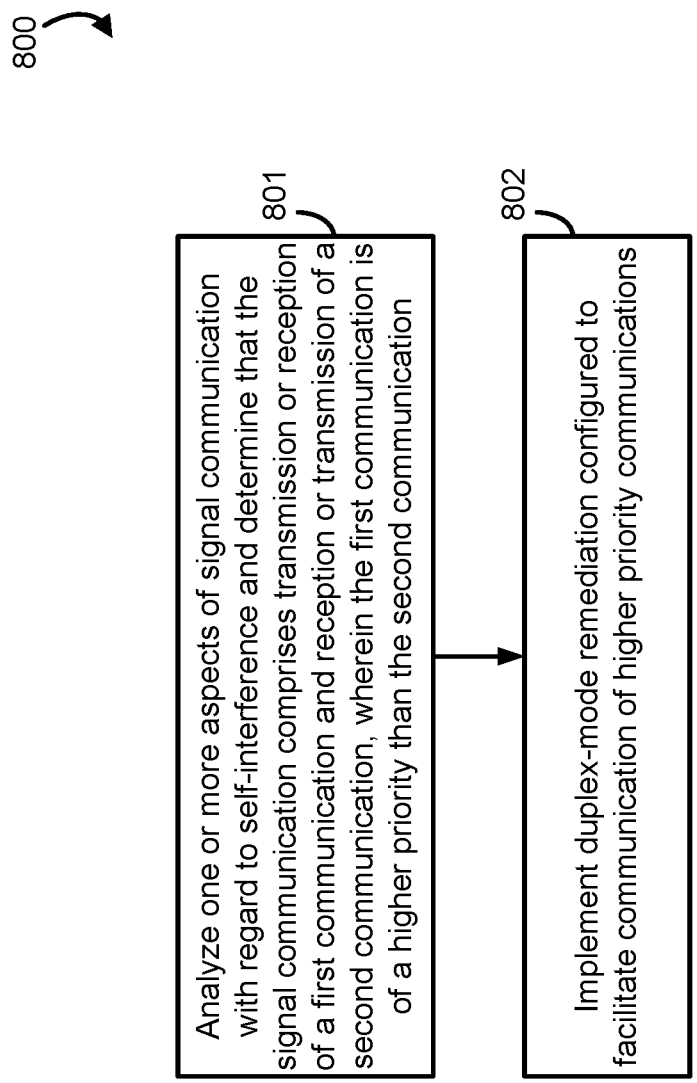

Each of the foregoing examples of self-interference associated with the full duplex wireless communications can result in transmission and/or reception failure during the wireless communications. To facilitate the signal communication a wireless communication station operating in a full duplex mode may implement duplex-mode remediation when an issue with respect to self-interference is identified. FIG. 5 shows an example of operation by a wireless communication station (e.g., base station 105, UE 115, etc.) to implement duplex-mode remediation according to aspects of the present disclosure. FIGS. 6-8 show examples of operation by wireless communication stations to implement duplex-mode remediation for various communication scenarios. In particular, FIGS. 6 and 7 show examples for random access phase communications and FIG. 8 shows an example for communications having different priorities.

Referring first to generalized flow 500 of FIG. 5, a wireless communication station operating in a full duplex mode analyzes one or more aspects of signal communication with regard to self-interference at block 501. For example, logic of base station 105 (e.g., self-interference logic executed by controller/processor 240) or logic of UE 115 (e.g., self-interference analysis logic executed by controller/processor 280) may analyze various aspects of signal communications that are currently being performed, that are scheduled to be performed, etc. to determine if one or more issues with respect to self-interference may be presented. As one example, logic of the wireless communication station may determine that the wireless communication station is operating in a full duplex mode and that one or more expected signals have not, or may have not, been received (e.g., signals responsive to signals transmitted by the wireless communication station, signals expected over a period of time or in the current operating situation, etc.). As another example, logic of the wireless communication station may determine that the wireless communication station is operating in a full duplex mode and that high priority information (e.g., data of a low latency application, a transmission repeat request, etc.) is scheduled for transmission to the wireless communication station, the reception of which may be compromised by full duplex transmission by the wireless communication station.

At block 502 of flow 500, the wireless communication station implements duplex-mode remediation when the analyzing determines an aspect of the one or more aspects of the signal communication presents an issue with respect to self-interference. For example, logic of base station 105 (e.g., duplex-mode remediation logic executed by controller/processor 240) or logic of UE 115 (e.g., duplex-mode remediation logic executed by controller/processor 280) may implement one or more changes with respect to the full duplex operation of the wireless communication station based upon determining that an issue with respect to self-interference may be, or is being, experienced. The one or more changes implemented with respect to the full duplex operation of the wireless communication station may, for example, be selected based upon the particular signal communications, the particular issues identified with respect to self-interference, the capabilities of the wireless communication station, a pre-configured remediation schedule (e.g., configured by the network), etc.

As an example of changes that may be implemented with respect to the full duplex operation, the wireless communication station may operate to increase interference cancellation performed by the wireless communication station. For example, where sufficient processing power and electrical power is available, the wireless communication station may apply more power interference cancellation by implementing more kernels for interference cancellation. The increased interference cancellation may sufficiently remediate the self-interference to facilitate satisfactory reception of signal communications by the wireless communication station while continuing to operate in a full duplex mode.

As another example of changes that may be implemented with respect to the full duplex operation, the wireless communication station may additionally or alternatively operate to alter the full duplex mode. For example, the wireless communication station may fall back from in-band full duplex to sub-band full duplex. It should be appreciated that, although in-band full duplex facilitates relatively large bandwidth for both the uplink and downlink, the use of shared frequency and time resources is prone to self-interference due to co-located transmission and reception of signals with carrier frequency overlap at the same time. Sub-band full duplex, utilizing carrier frequencies separated by a guard band, may remediate the self-interference at least to some extent. Thus, falling back from in-band full duplex to sub-band full duplex may sufficiently remediate the self-interference to facilitate satisfactory reception of signal communications by the wireless communication station while continuing to operate in a full duplex mode. Sub-band full duplex communications, implementing co-located transmission and reception of signals at the same time is prone to self-interference due to relatively small separation of the carrier frequencies and the higher signals strength of the transmitted signal relative to the received signal at the wireless communication station. Accordingly, the wireless communication station may fall back from in-band full duplex to half duplex, or from sub-band full duplex, to half duplex, in some situations to facilitate satisfactory reception of signal communications by the wireless communication station while continuing to operate in a full duplex mode.

In accordance with aspects of the present disclosure, a wireless communication station may implement duplex-mode remediation iteratively (e.g., as represented by the dotted line returning to block 501 from block 502 of flow 500). For example, the wireless communication station may determine that an aspect of the one or more aspects of the signal communication presents an issue with respect to self-interference and thus implement a first level of duplex-mode remediation. Thereafter, the wireless communication station may further analyze signal communication (e.g., as being performed using the duplex-mode remediation, as is newly scheduled, etc.) and determine that an aspect of the one or more aspects of the signal communication presents an issue with respect to self-interference and thus implement a second level of duplex-mode remediation, and so on. Such iterative duplex-mode remediation may, for example, progress through a plurality of duplex-mode remediation actions, such as from the duplex-mode remediation action supporting highest bandwidth communications to the duplex-mode remediation action supporting lowest bandwidth communications. For example, a wireless communication station may iteratively progress from in-band full duplex with power efficient interference cancellation, to in-band full duplex with increased interference cancellation, from in-band full duplex with increased interference cancellation to sub-band full duplex, from sub-band full duplex to half duplex. In accordance with aspects of the invention, duplex-mode remediation may iterate from and between any combination of duplex-mode remediation actions desired.

Referring now to FIGS. 6 and 7, example implementations of the foregoing duplex-mode remediation techniques for random access phase communications are shown. A random access channel (RACH) procedure may, for example, comprise a contention based 4-step random access procedure in which the UE wishing to access the network may transmit a first message (Msg1) in which a randomly selected preamble is transmitted over some RACH occasion (RO) to a base station. Thereafter, the UE may monitor for a second message (Msg2) from the base station for facilitating establishing a link between the UE and base station. The second message may, for example, comprise a message of a physical downlink control channel (PDCCH) transmitted over a RACH response (RAR) window and/or a physical downlink shared channel (PDSCH) containing time alignment (TA), random access preamble ID (RAPID), uplink grant, etc. The UE, having received the second message, may transmit a third message (Msg3) for contention resolution sequence in the uplink grant and monitor for a fourth message (Msg4) from the base station providing contention resolution. It should be appreciated that in operation according to the above described random access phase, when a full duplex base station is monitoring for RACH Msg1 while transmitting any downlink signal, the downlink signal interferes to at least some extent on the reception of Msg1. Similarly, when a full duplex UE is monitoring for RACH Msg2 while transmitting any other uplink signal, the uplink signal interferes to at least some extent on the reception of Msg2. If the UE fails to receive the second message (Msg2) from the base station in response to the first message (Msg1), such as due to self-interference, the RACH procedure does not proceed to establish a link between the UE and base station. Likewise, if the base station fails to receive the first message (Msg1) from the UE, such as due to self-interference, the second message (Msg2) will not be transmitted and the RACH procedure does not proceed to establish a link between the UE and base station.

FIG. 6 shows an example of a UE implementing duplex-mode remediation for random access phase communications. In flow 600 shown in FIG. 6, the wireless communication station (e.g., UE 115) is operating in a full duplex mode and initiates a RACH procedure to establish a communication link with a base station (e.g., one of base stations 105). Accordingly, at block 601 the wireless communication station transmits a first message of a random access procedure. For example, UE 115 may transmit RACH Msg1 to one of base stations 105 in an attempt to establish a communication link with the base station.

At block 602 of flow 600, the wireless communication station monitors for a second message of the random access procedure responsive to the first message. For example, UE 115 may monitor a RAR window of a PDCCH and/or a PDSCH for RACH Msg2 transmitted by base station 105 in response to Msg1.

At block 603 of flow 600 shown in FIG. 6, the wireless communication station operating in a full duplex mode analyzes one or more aspects of signal communication with regard to self-interference and determines that the second message has not been received after transmission of the first message a threshold number of times. For example, logic of UE 115 (e.g., self-interference analysis logic executed by controller/processor 280) may analyze the communication signals received by the UE to determine if RACH Msg2 has been detected after transmitting Msg1 a threshold number of times (e.g., N transmissions of RACH Msg1 by the UE without detecting a responsive Msg2, where N may be any integer value determined to be appropriate, such as 1-10). Failure to detect RACH Msg2 in response to transmission of a requisite number of Msg1 by the UE may be identified by the logic of UE 115 to indicate an issue with respect to self-interference (e.g., the use of shared frequency and/or time resources according to the full duplex operation may be presenting self-interference resulting in transmission and/or reception failure during the wireless communications). For example, the transmission of the uplink signal may make it harder for the UE to detect Msg2 (e.g., the network detected the RACH Msg1 and sent a response but the UE is unable to decode it).

At block 604 of flow 600, the wireless communication station implements duplex-mode remediation altering the duplex mode. For example, logic of UE 115 (e.g., duplex-mode remediation logic executed by controller/processor 280) may implement one or more changes with respect to the full duplex operation of the wireless communication station based upon determining that RACH Msg2 has not been detected after transmitting Msg1 a threshold number of times. The duplex-mode remediation altering the duplex mode may, for example, provide for a wireless communication station operating in an in-band full duplex mode to fall back to a sub-band full duplex mode or a half duplex mode. Similarly, according to some aspects of the disclosure, the duplex-mode remediation altering the duplex mode may, for example, provide for a wireless communication station operating in a sub-band full duplex mode to fall back to a half duplex mode. As with the more general flow of FIG. 5, a wireless communication station may implement duplex-mode remediation in accordance with flow 600 iteratively (e.g., returning to block 601 from block 604 of flow 600).

FIG. 7 shows an example of a base station implementing duplex-mode remediation for random access phase communications. In flow 700 shown in FIG. 7, the wireless communication station (e.g., base station 105) is operating in a full duplex mode and monitors for a first message of a RACH procedure for establishing a communication link with another wireless communication station (e.g., one of UEs 115). Accordingly, at block 701 the wireless communication station monitors for a first message of a random access procedure. For example, base station 105 may monitor for RACH Msg1 transmitted by UE 105 to base station 105 in an attempt to establish a communication link with the base station.

At block 702 of flow 700 shown in FIG. 7, the wireless communication station operating in a full duplex mode analyzes one or more aspects of signal communication with regard to self-interference and determines that the wireless communication station fails excessively to receive the first message. For example, logic of base station 105 (e.g., self-interference analysis logic executed by controller/processor 240) may analyze the communication signals received by the base station to estimate a number of instances of the first message being transmitted and not successfully received by the wireless communication station. In accordance with some aspects of the disclosure, a hypothesis test or a machine learning technique may be applied to a received signal, logic of base station 105 for estimating the possible number of preambles forming a RACH Msg1 being transmitted in a given RO and not successfully detected. Such estimation of preambles forming a RACH Msg1 may be possible, although recovery of the RACH Msg1 may nevertheless fail (e.g., due to self-interference). In another example, logic of base station 105 may receive data from a second wireless communication station (e.g., UE 115), after establishing a communication connection with the wireless communication station, regarding a number of retransmissions of the first message by the second wireless communication prior to establishing the communication connection with the wireless communication station. Irrespective of the particular technique utilized, excessive failure to receive the first message by the base station may be identified by the logic of base station 105 to indicate an issue with respect to self-interference (e.g., the use of shared frequency and/or time resources according to the full duplex operation may be presenting self-interference resulting in transmission and/or reception failure during the wireless communications).

At block 703 of flow 700, the wireless communication station implements duplex-mode remediation altering the duplex mode. For example, logic of base station 105 (e.g., duplex-mode remediation logic executed by controller/processor 240) may implement one or more changes with respect to the full duplex operation of the wireless communication station based upon determining that the base station has failed excessively to receive RACH Msg1. The duplex-mode remediation altering the duplex mode may, for example, provide for a wireless communication station operating in an in-band full duplex mode to fall back to a sub-band full duplex mode or a half duplex mode. Similarly, according to some aspects of the disclosure, the duplex-mode remediation altering the duplex mode may, for example, provide for a wireless communication station operating in a sub-band full duplex mode to fall back to a half duplex mode. As with the more general flow of FIG. 5, a wireless communication station may implement duplex-mode remediation in accordance with flow 700 iteratively (e.g., returning to block 701 from block 703 of flow 700).

It should be appreciated that issues with respect to self-interference are not limited to those of the example random access procedure discussed above. Self-interference can in general cause transmission/reception failure during the entire communications process. In particular, priority of different channels present challenges with respect to self-interference. When a full duplex UE has a downlink of high priority and an uplink with low priority, the high priority signal may be compromised because of the uplink self-interference. For example, ultra-reliable low-latency communication (URLLC) may have a different priority (e.g., higher priority) than other transmissions (e.g., enhanced mobile broadband (eMBB)). In the case of receiving URLLC while transmitting eMBB in a full duplex mode, the self-interference of the eMBB transmission will interfere to at least some extent on the URLLC, wherein such self-interference may reduce the reliability of the URLLC downlink. Likewise, there are different priorities within eMBB (e.g., PUSCH and downlink hybrid automatic repeat request (DL-HARQ). Assuming that the HARQ transmission has higher priority, if the PUSCH transmission is combined with the DL-HARQ reception in a full-duplex operation, the uplink transmission may compromise the reliability of the high priority downlink. If downlink reception keeps failing, one reason may be self-interference from full duplex transmission.

An example implementation of duplex-mode remediation techniques for communications having different priorities is shown in FIG. 8. At block 801 of FIG. 8, a wireless communication station operating in a full duplex mode analyzes one or more aspects of signal communication with regard to self-interference and determines that the signal communication comprises transmission or reception of a first communication and reception or transmission of a second communication, wherein the first communication is of a higher priority than the second communication. For example, logic of base station 105 (e.g., self-interference logic executed by controller/processor 240) or logic of UE 115 (e.g., self-interference analysis logic executed by controller/processor 280) may analyze various aspects of signal communications that are currently being performed (e.g., to determine the channels being used, the type of data being transmitted, the particular applications associated with the communications, etc.) to identify one communication (e.g., the downlink communication signal) as having a higher priority than another communication (e.g., the uplink communication signal) and determine that one or more issues with respect to self-interference may be presented. As another example, logic of base station 105 or logic of UE 115 may analyze various aspects of signal communications that are scheduled for transmission (e.g., analyzing data in a transmission queue, downlink control information (DCI), etc.) to identify one communication (e.g., the downlink communication signal) as having a higher priority than another communication (e.g., the uplink communication signal) and determine that one or more issues with respect to self-interference may be presented. Accordingly, the logic of the wireless communication station may determine that the wireless communication station is operating in a full duplex mode and that high priority information may be compromised by full duplex transmission by the wireless communication station.

At block 802 of flow 800, the wireless communication station implements duplex-mode remediation configured to facilitate communication of higher priority communications. For example, logic of base station 105 (e.g., duplex-mode remediation logic executed by controller/processor 240) or logic of UE 115 (e.g., duplex-mode remediation logic executed by controller/processor 280) may implement one or more changes with respect to the full duplex operation of the wireless communication station based upon determining that an issue with respect to self-interference may be, or is being, experienced. The duplex-mode remediation altering the duplex mode may, for example, provide for a wireless communication station operating in an in-band full duplex mode to increase interference cancellation and/or to fall back to a sub-band full duplex mode or a half duplex mode. Similarly, according to some aspects of the disclosure, the duplex-mode remediation altering the duplex mode may, for example, provide for a wireless communication station operating in a sub-band full duplex mode to increase interference cancellation and/or to fall back to a half duplex mode. As with the more general flow of FIG. 5, a wireless communication station may implement duplex-mode remediation in accordance with flow 800 iteratively (e.g., returning to block 801 from block 802 of flow 800).

Figure 9:
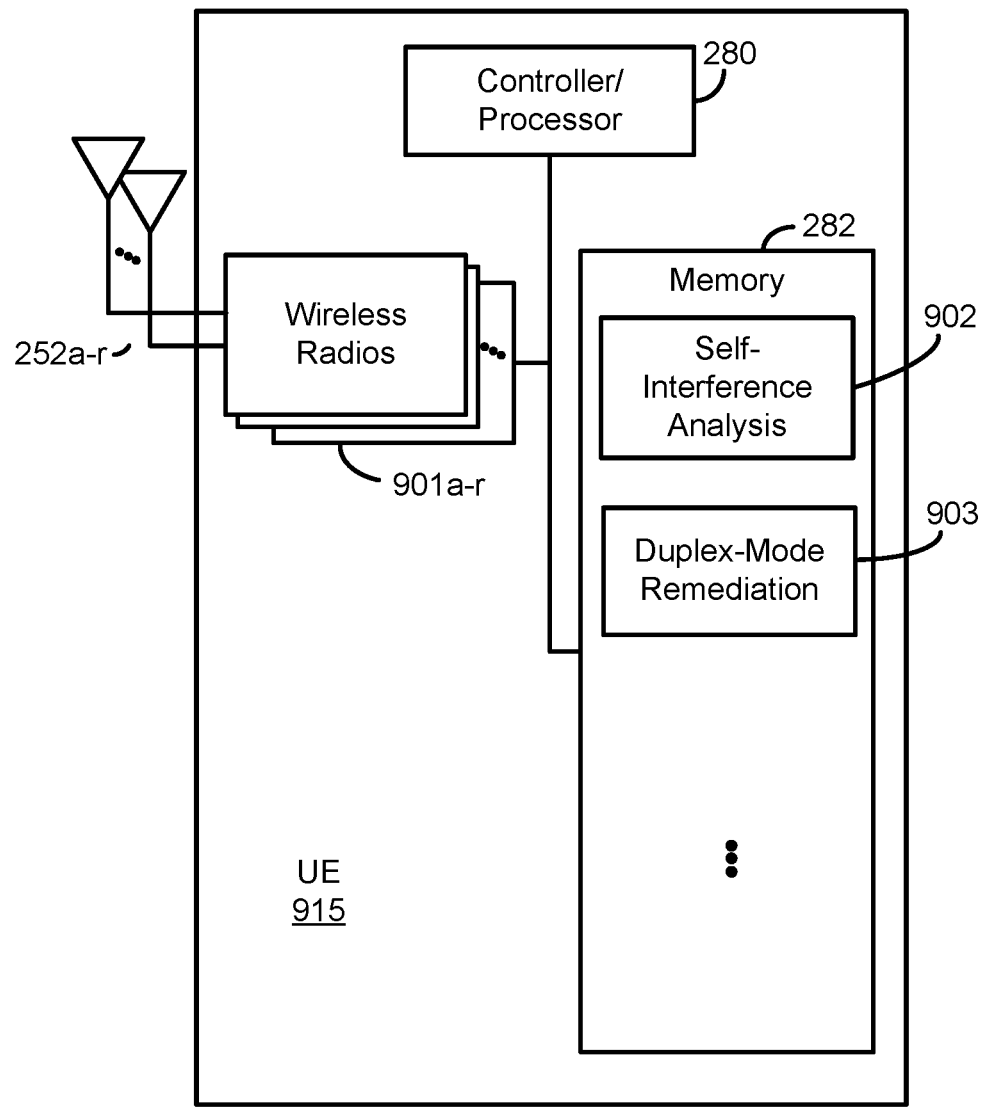
FIG. 9 is a block diagram conceptually illustrating a design of a UE configured for duplex-mode remediation operation according to some aspects of the present disclosure.

FIG. 9 shows a block diagram illustrating UE 915 configured according to one aspect of the present disclosure. UE 915 includes the structure, hardware, and components as illustrated for UE 115 of FIG. 2. For example, UE 915 includes controller/processor 280, which operates to execute logic or computer instructions stored in memory 282, as well as controlling the components of UE 915 that provide the features and functionality of UE 915. UE 915, under control of controller/processor 280, transmits and receives signals via wireless radios 910a-r and antennas 252a-r. Wireless radios 910a-r includes various components and hardware, as illustrated in FIG. 2 for UE 115, including modulator/demodulators 254a-r, MIMO detector 256, receive processor 258, transmit processor 264, and TX MIMO processor 266.

In the example of FIG. 9, UE 915 includes self-interference analysis logic 902, such as may comprise logic for analyzing one or more aspects of signal communication and determining if an issue with respect to self-interference is presented. Self-interference analysis logic 902 may, for example, perform and/or control analysis of signal communication as discussed above with respect to block 501 of flow 500, block 603 of flow 600, block 702 of flow 700, and/or block 801 of flow 800.

UE 915 shown in FIG. 9 further includes duplex-mode remediation logic 903, such as may comprise logic for implementing duplex-mode remediation when an issue with respect to self-interference is determined by self-interference analysis logic 902 to be presented. For example, duplex-mode remediation logic 903 may perform and/or control duplex-mode remediation as discussed above with respect to block 502 of flow 500, block 604 of flow 600, block 703 of flow 700, and/or block 802 of flow 800.

Figure 10:
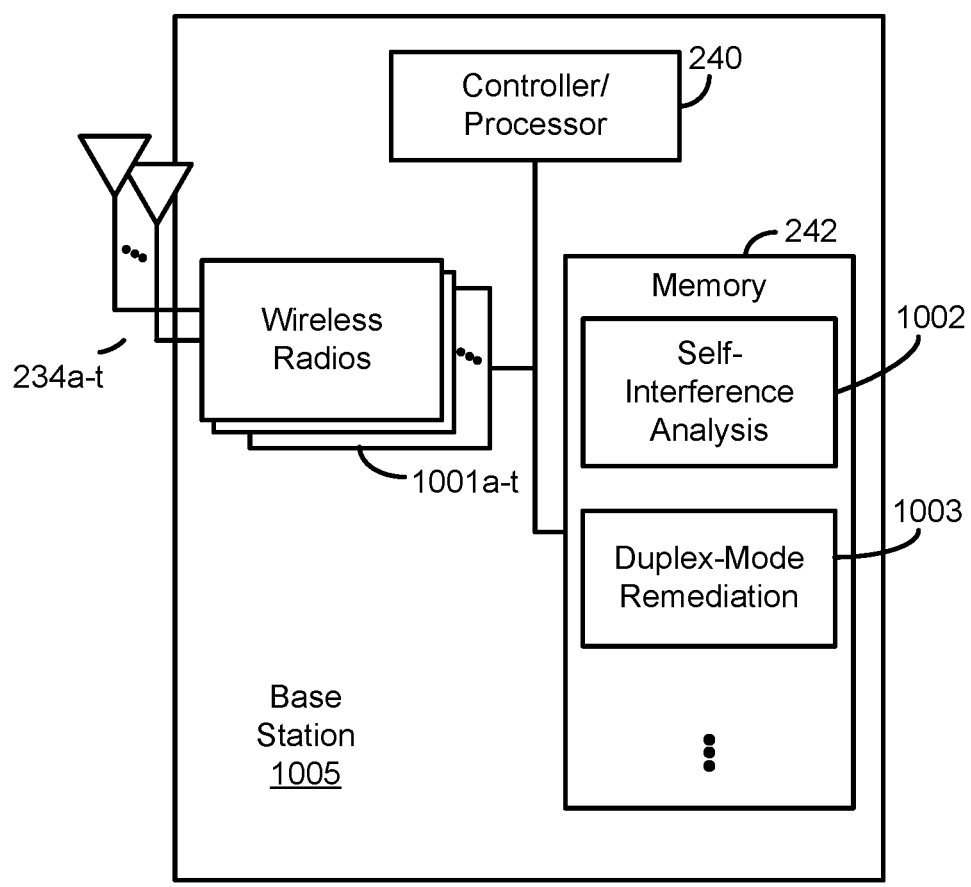
FIG. 10 is a block diagram conceptually illustrating a design of a base station configured for duplex-mode remediation operation according to some aspects of the present disclosure.

FIG. 10 shows a block diagram illustrating base station 1005 configured according to one aspect of the present disclosure. Base station 1005 includes the structure, hardware, and components as illustrated for base station 105 of FIG. 2. For example, base station 1005 includes controller/processor 240, which operates to execute logic or computer instructions stored in memory 242, as well as controlling the components of base station 1005 that provide the features and functionality of base station 1005. Base station 1005, under control of controller/processor 240, transmits and receives signals via wireless radios 1010a-t and antennas 234a-t. Wireless radios 1010a-t includes various components and hardware, as illustrated in FIG. 2 for base station 105, including modulator/demodulators 232a-t, MIMO detector 236, receive processor 238, transmit processor 220, and TX MIMO processor 230.

In the example of FIG. 10, base station 1005 includes self-interference analysis logic 1002, such as may comprise logic for analyzing one or more aspects of signal communication and determining if an issue with respect to self-interference is presented. Self-interference analysis logic 1002 may, for example, perform and/or control analysis of signal communication as discussed above with respect to block 501 of flow 500, block 603 of flow 600, block 702 of flow 700, and/or block 801 of flow 800.

Base station 1015 shown in FIG. 10 further includes duplex-mode remediation logic 1003, such as may comprise logic for implementing duplex-mode remediation when an issue with respect to self-interference is determined by self-interference analysis logic 1002 to be presented. For example, duplex-mode remediation logic 1003 may perform and/or control duplex-mode remediation as discussed above with respect to block 502 of flow 500, block 604 of flow 600, block 703 of flow 700, and/or block 802 of flow 800.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
analyzing, by a wireless communication station operating in a full duplex mode, one or more aspects of signal communication with regard to self-interference;
implementing, by the wireless communication station, duplex-mode remediation by falling back from the full duplex mode to facilitate the signal communication when the analyzing determines a particular aspect of the one or more aspects of the signal communication presents an issue with respect to self-interference;
transmitting, by the wireless communication station in the full duplex mode, a first message of a random access procedure; and
monitoring, by the wireless communication station, for a second message of the random access procedure responsive to the first message, wherein the particular aspect comprises a failure to receive the second message.

2. The method of claim 1, wherein falling back from the full duplex mode comprises:

falling back to a sub-band full duplex mode from an in-band full duplex mode.

3. A method of wireless communication, comprising:
analyzing, by a wireless communication station operating in a sub-band full duplex mode, one or more aspects of signal communication with regard to self-interference;
implementing, by the wireless communication station, duplex-mode remediation by falling back from the sub-band full duplex mode to facilitate the signal communication when the analyzing determines an aspect of the one or more aspects of the signal communication presents an issue with respect to self-interference;
transmitting, by the wireless communication station in the sub-band full duplex mode, a first message of a random access procedure; and
monitoring, by the wireless communication station, for a second message of the random access procedure, wherein implementing the duplex-mode remediation by falling back from the sub-band full duplex mode alters the sub-band full duplex mode when the analyzing determines that the second message has not been received after transmission of the first message a threshold number of times.

4. The method of claim 3, wherein altering the sub-band full duplex mode by the implementing duplex-mode remediation comprises:
falling back to a half duplex mode from the sub-band full duplex mode.

5. A method of wireless communication, comprising:
analyzing, by a wireless communication station operating in a full duplex mode, one or more aspects of signal communication with regard to self-interference; and
implementing, by the wireless communication station, duplex-mode remediation by falling back from the full duplex mode to facilitate the signal communication when the analyzing determines a particular aspect of the one or more aspects of the signal communication presents an issue with respect to self-interference, wherein analyzing one or more aspects of signal communication with regard to self interference determines that the signal communication comprises transmission or reception of a first communication and reception or transmission of a second communication, wherein the first communication is of a higher priority than the second communication, and wherein implementing the duplex-mode remediation by falling back from the full duplex mode alters the full duplex mode to facilitate communication of the first communication when the analyzing determines that the issue with respect to self-interference is present.

6. The method of claim 5, wherein the full duplex mode comprises an in-band full duplex mode, and wherein altering the full duplex mode comprises:
falling back to a sub-band full duplex mode from the in-band full duplex mode.

7. The method of claim 5, wherein the full duplex mode comprises an in-band full duplex mode, and wherein altering the full duplex mode comprises:
falling back to a half duplex mode from the in-band full duplex mode.

8. The method of claim 5, wherein the full duplex mode comprises a sub-band full duplex mode, and wherein altering the full duplex mode comprises:
falling back to a half duplex mode from the sub-band full duplex mode.

9. The method of claim 1, wherein the falling back from the full duplex mode comprises:
falling back to a half duplex mode from an in-band full duplex mode.

10. The method of claim 1, wherein the falling back from the full duplex mode comprises:
falling back to a half duplex mode from a sub-band full duplex mode.

11. A method of wireless communication, comprising:
analyzing, by a wireless communication station operating in a full duplex mode, one or more aspects of signal communication with regard to self-interference;
implementing, by the wireless communication station, duplex-mode remediation by falling back from the full duplex mode to facilitate the signal communication when the analyzing determines a particular aspect of the one or more aspects of the signal communication presents an issue with respect to self-interference; and
monitoring, by the wireless communication station operating in the full duplex mode, for a first message of a random access procedure, wherein the particular aspect comprises a failure to receive the first message.

12. The method of claim 11, wherein implementing duplex-mode remediation by falling back from the full duplex mode comprises:
falling back to a half duplex mode from the full duplex mode.

13. An apparatus configured for wireless communication, the apparatus comprising:
at least one processor; and
at least one memory coupled to the at least one processor, wherein the at least one processor is configured to cause the apparatus to:
transmit, during operation in a full duplex mode, a first message of a random access procedure;
monitor, duration operation in the full duplex mode, for a second message of the random access procedure responsive to the first message;
analyze, during operation in the full duplex mode, one or more aspects with regard to self-interference resulting in identification of a failure to receive the second message; and
fallback, based on the identification of the failure to receive the second message, from the full duplex mode to facilitate signal communication.

14. The apparatus of claim 13, wherein, to fallback from the full duplex mode, the at least one processor is configured to cause the apparatus to fallback to a sub-band full duplex mode from an in-band full duplex mode.

15. An apparatus configured for wireless communication, the apparatus comprising:
at least one processor; and
at least one memory coupled to the at least one processor, wherein the at least one processor is configured to cause the apparatus to:
transmit, during operation in a sub-band full duplex mode, a first message of a random access procedure; and
monitor, during operation in the sub-band full duplex mode, for a second message of the random access procedure;
analyze, during operation in the sub-band full duplex mode, one or more aspects with regard to self-interference resulting in identification of a failure to receive the second message after transmission of the first message a threshold number of times; and fallback, based on the identification of the failure to receive the second message, from the sub-band full duplex mode to a different mode to facilitate signal communication.

16. The apparatus of claim 15, wherein the different mode is a half duplex mode.

17. An apparatus configured for wireless communication, the apparatus comprising:
at least one processor; and
at least one memory coupled to the at least one processor, wherein the at least one processor is configured to cause the apparatus to:
monitor, during operation in a full duplex mode, for a first message of a random access procedure;
analyze, during operation in the full duplex mode, one or more aspects with regard to self-interference resulting in identification of a failure to receive the first message; and
fallback, based on the identification of the failure to receive the first message, from the full duplex mode to a different mode to facilitate signal communication.

18. The apparatus of claim 17, wherein the different mode is a half duplex mode.

19. An apparatus configured for wireless communication, the apparatus comprising:
at least one processor; and
at least one memory coupled to the at least one processor, wherein the at least one processor is configured to cause the apparatus to:
transmit or receive, during operation in a full duplex mode, a first communication;
transmit or receive, during operation in the full duplex mode, a second communication, wherein the first communication is of a higher priority than the second communications; and
fallback, based on a determination that a self-interference issue is present, from the full duplex mode to a different mode to facilitate communication of the first communication.

20. The apparatus of claim 19, wherein the full duplex mode comprises an in-band full duplex mode, and wherein the different mode is a sub-band full duplex mode.

21. The apparatus of claim 19, wherein the full duplex mode comprises an in-band full duplex mode, and wherein the different mode is a half duplex mode.

22. The apparatus of claim 19, wherein the full duplex mode comprises a sub-band full duplex mode, and wherein the different mode is a half duplex mode.

23. The apparatus of claim 13, wherein, to fallback from the full duplex mode, the at least one processor is configured to cause the apparatus to fallback to a half duplex mode from an in-band full duplex mode.

24. The apparatus of claim 13, wherein, to fallback from the full duplex mode, the at least one processor is configured to cause the apparatus to fallback to a half duplex mode from an sub-band full duplex mode.

* * * * *